United States Patent
Noguchi et al.

(10) Patent No.: US 11,021,590 B2
(45) Date of Patent: Jun. 1, 2021

(54) SILICONE-COATED FILLER AND PRODUCTION PROCESS FOR THE SAME AS WELL AS RESINOUS COMPOSITION

(71) Applicant: ADMATECHS CO., LTD., Miyoshi (JP)

(72) Inventors: Shingi Noguchi, Miyoshi (JP); Masaru Kuraki, Miyoshi (JP); Tempo Nakamura, Miyoshi (JP); Tomio Inoue, Miyoshi (JP)

(73) Assignee: ADMATECHS CO., LTD., Miyoshi (JP)

( * ) Notice: Subject to any disclaimer, the term of this patent is extended or adjusted under 35 U.S.C. 154(b) by 0 days.

(21) Appl. No.: 16/841,423

(22) Filed: Apr. 6, 2020

(65) Prior Publication Data

US 2020/0239668 A1 Jul. 30, 2020

Related U.S. Application Data

(63) Continuation of application No. PCT/JP2018/026938, filed on Jul. 18, 2018.

(30) Foreign Application Priority Data

Oct. 4, 2017 (JP) .............................. JP2017-194446

(51) Int. Cl.
| | |
|---|---|
| *C09C 3/12* | (2006.01) |
| *C08K 9/06* | (2006.01) |
| *C08K 3/22* | (2006.01) |
| *C08L 83/04* | (2006.01) |
| *C09C 1/40* | (2006.01) |

(52) U.S. Cl.
CPC ............... *C08K 9/06* (2013.01); *C08K 3/22* (2013.01); *C08L 83/04* (2013.01); *C09C 1/407* (2013.01); *C01P 2002/82* (2013.01); *C08K 2003/2227* (2013.01)

(58) Field of Classification Search
CPC .... C08K 9/06; C08K 3/22; C08K 2003/2227; C08L 83/04; C01P 2006/22; C01P 2004/61; C09C 3/12; C09C 3/006; C09C 1/407; C01B 13/14; C01F 7/02
USPC ........................................................ 523/206
See application file for complete search history.

(56) References Cited

U.S. PATENT DOCUMENTS

| | | | |
|---|---|---|---|
| 9,006,354 B2 | 4/2015 | Otsuka et al. | |
| 9,150,698 B2 | 10/2015 | Otsuka et al. | |
| 10,358,354 B2 * | 7/2019 | Hagimoto | C08K 9/06 |
| 10,619,013 B2 * | 4/2020 | Onda | C08K 9/06 |
| 2008/0292711 A1 | 11/2008 | Berg-Schultz et al. | |
| 2013/0148932 A1 | 6/2013 | Cornelissen et al. | |
| 2013/0211016 A1 | 8/2013 | Otsuka et al. | |
| 2015/0105522 A1 | 4/2015 | Otsuka et al. | |
| 2015/0299543 A1 * | 10/2015 | Miyamoto | C08L 83/04 |
| | | | 257/100 |
| 2017/0174841 A1 * | 6/2017 | Iguchi | C08L 83/04 |

FOREIGN PATENT DOCUMENTS

| | | |
|---|---|---|
| CN | 103003365 A | 3/2013 |
| JP | 2004-323652 A | 11/2004 |
| JP | 2006-206413 A | 8/2006 |
| JP | 2008-537532 A | 9/2008 |
| JP | 2010-090007 A | 4/2010 |
| JP | 2010-090008 A | 4/2010 |
| JP | 2010-235693 A | 10/2010 |
| JP | 5350741 B2 | 11/2013 |
| JP | 2014-185069 A | 10/2014 |
| JP | 2015-086092 A | 5/2015 |

OTHER PUBLICATIONS

Combined Chinese Office Action and Search Report dated Mar. 30, 2020 in Chinese Patent Application No. 201880023045.7 (with unedited computer generated English translation and English translation of Category of Cited Documents), citing documents AA and AO therein, 10 pages.
Extended European Search Report dated May 7, 2020 in European Patent Application No. 18865065.9, citing documents AP, AQ and AR therein, 7 pages.
International Search Report dated Oct. 2, 2018 in PCT/JP 2018/026938 filed Jul. 18, 2018 (w/ Translation by WIPO).
Written Opinion dated Oct. 2, 2018 in PCT/JP 2018/026938 filed Jul. 18, 2018 (w/ Machine Translation).
Decision to Grant of JP 2019-518577 dated May 9, 2019.

* cited by examiner

*Primary Examiner* — Hannah J Pak

(74) *Attorney, Agent, or Firm* — Oblon, McClelland, Maier & Neustadt, L.L.P.

(57) ABSTRACT

A silicone-coated filler comprises: a particulate material mainly composed of an inorganic oxide formed by oxidizing a predetermined element; a first silicone structure bonded to a surface of the particulate material by way of a "-'the predetermined element'-OSi—" structure; and a second silicone structure including a cross-linking structure with a carbon-carbon structure directly bonded to a silicon atom of the first silicone structure, and a polysiloxane structure bonded to the cross-linking structure.

4 Claims, 5 Drawing Sheets

SILICONE-COATED FILLER AND PRODUCTION PROCESS FOR THE SAME AS WELL AS RESINOUS COMPOSITION

CROSS REFERENCE TO RELATED APPLICATIONS

The present application is a Continuation Application of International Application No. PCT/JP2018/026938, filed on Jul. 18, 2018, which is incorporated herein by reference. The present invention is based on Japanese Patent Application No. 2017-194446, filed on Oct. 4, 2017, the entire contents of which are incorporated herein by reference.

BACKGROUND OF THE INVENTION

1. Field of the Invention

The present invention relates to a silicone-coated filler and a production process for the same, as well as a resinous composition containing the silicone-coated filler.

2. Description of the Related Art

A resinous composition, in which a particulate material composed of an inorganic oxide is dispersed in a silicone resin, has been known. Since the thus obtained resinous composition exhibits a heightened viscosity, it has been difficult for the resinous composition to contain a particulate material with a high filling rate.

For the purpose of lowering the viscosity of a resinous composition, it has been tried to coat a silicone resin on a surface of the particulate in order to improve the affinity between the particulate material and the silicone resin.

As a technique for coating a silicone resin on the surface of a particulate material, Japanese Unexamined Patent Publication (KOKAI) Gazette No. 2015-86092 discloses a technique in which a liquid with an aluminum oxide power dispersed is reacted with an organosiloxane oligomer in high-temperature and highly-pressurized water.

Moreover, Japanese Unexamined Patent Application Publication (Translation of PCT Application) Gazette No. 2008-537532 discloses metallic oxide-coated particles involving metallic oxide particles and at least one member of coatings (e.g., polysiloxane-based sunscreen agents).

Moreover, Japanese Unexamined Patent Publication (KOKAI) Gazette No. 2014-185069 discloses silica particles that are surface treated by a silicone oil in supercritical carbon oxide.

In addition, Japanese Unexamined Patent Publication (KOKAI) Gazette No. 2006-206413 discloses surface-treated silica fine particles which are coated by a silicone oil and whose average primary particle diameter is from 50 to 200 nm.

SUMMARY OF THE INVENTION

However, the technique according to Japanese Unexamined Patent Publication (KOKAI) Gazette No. 2015-86092 has been suffering from higher costs and additionally has not been able to demonstrate any sufficient viscosity lowering effect, because it requires a high-temperature, highly-pressurized reactor and performs the production by batch.

The technique according to Japanese Unexamined Patent Application Publication (Translation of PCT Application) Gazette No. 2008-537532 has not been able to demonstrate any sufficient viscosity lowering effect, because the surface treatment forms thin coating layers.

The technique according to Japanese Unexamined Patent Publication (KOKAI) Gazette No. 2014-185069 has been suffering from higher costs, because it requires a high-temperature, highly-pressurized reactor.

The technique according to Japanese Unexamined Patent Publication (KOKAI) Gazette No. 2006-206413 has not been able to demonstrate any sufficient viscosity lowering effect, because it has been difficult for the technique to form coating layers in an ample amount.

The present invention has been made in view of the aforementioned circumstances. It is therefore a to-be-achieved assignment to the present invention to provide a silicone-coated filler capable of demonstrating a sufficient viscosity lowering effect when dispersed in silicone resins, and a production process for the same, as well as a resinous composition using the same.

As a result of investigations that the present inventors carried out earnestly in order to achieve the aforementioned assignment, they discovered that a two-staged silicone-structure introduction into the surface of a particulate material enables the particulate material to demonstrate a sufficient viscosity lowering effect, thereby completing the following subject matters.

(1) A production process for silicone-coated filler according to the present invention achieving the aforementioned assignment comprises:

a first step of reacting some of multiple SiH groups, which a first silicone material includes, with a surface of a particulate material mainly composed of an inorganic oxide formed by oxidizing a predetermined element and including an OH group in a surface thereof; and a second step of subjecting a second silicone material including an alkenyl group at an end thereof to an addition reaction in which the second silicone material is added to at least some of a reminder of the multiple SiH groups resulting from the first silicone material.

The particulate material has OH groups existing in the surface, because it is mainly composed of the inorganic oxide. An SiH group is capable of reacting with an OH group under a proper condition. The first step firmly bonds the first silicone material having SiH groups to the surface of the particulate material. The SiH groups remain even after the first step has finished, because only some of the SiH groups, which the first silicone material has, react with the particulate material at the first step. The remaining SiH groups react with an alkenyl group under a proper condition. The second step bonds the second silicone material to the first silicone material, because the second silicon material having an alkenyl group reacts with the SiH groups resulting from the first silicone material.

Thus, it becomes possible to firmly bond the first silicone material and the second silicone material to a surface of the particulate material in this order. Consequently, the thus produced silicone-coated filler is able to demonstrate a sufficient viscosity lowering effect when being dispersed in silicone resins, because it has an ample amount of silicone materials that come to exist in its surface.

Moreover, in the present invention, the first step, or the second step is preferably a step of reacting all of the SiH groups existing in the particulate material; or preferably further includes a disappearance step of making the SiH groups remaining in a surface of the particulate material disappear by reacting the SiH groups after the second step.

Making the SiH groups disappear allows the silicone-coated filler to exhibit upgraded stability when being dispersed in silicone resins. An employable silicone resin to be mixed with the silicon-coated resin involves prior-to-curing silicone-resin precursors. However, in a lesser amount the precursors have SiH groups the higher they can be in the stability, because they might possibly react with the SiH groups.

A possible disappearance step involves adapting it to a step of bringing the surface of the particulate material into contact with monoethanolamine and/or diethanolamine.

(2) The silicon-coated filler produced by the above-described production process is able to exhibit a low viscosity stably even when being dispersed in silicone resins, because it exhibits high affinity between itself and the silicone resins.

That is, a silicone-coated filler according to the present invention achieving the aforementioned assignment comprises:

a particulate material mainly composed of an inorganic oxide formed by oxidizing a predetermined element;

a first silicone structure bonded to a surface of the particulate material by way of a "-'the predetermined element'-OSi—" structure; and a second silicone structure including a cross-linking structure with a carbon-carbon structure directly bonded to a silicon atom of the first silicone structure, and a polysiloxane structure bonded to the cross-linking structure.

Moreover, the present silicone-coated filler is preferably virtually free from any SiH group in the surface. The nonexistence of SiH group allows resinous compositions, which is produced by dispersing the present silicone-coated filler in a precursor of silicone resins, to have upgraded stability.

In addition, the predetermined element is preferably aluminum (Al). Since alumina, an oxide of Al, exhibits high thermal conductive property, resinous compositions, in which the present silicone-coated filler with Al serving as the predetermined element is dispersed in silicone resins, can be suitably employed for applications that require conductive property.

(3) A resinous composition according to the present invention achieving the aforementioned assignment comprises:

a silicone-coated filler produced by the above-described production process, or a silicone-coated filler described above; and a silicone resin dispersing the silicone-coated filler.

The production process for silicone-coated filler according to the present invention is a method enabling a silicone material to effectively coat a particulate material on the surface. As a result, the thus produced silicone-coated filler, and the resinous composition according to the present invention, in which the silicone-coated filler according to the present invention is dispersed in a silicone resin, are capable of effectively inhibiting their viscosity from increasing.

DESCRIPTION OF THE EMBODIMENTS

Figure 1:
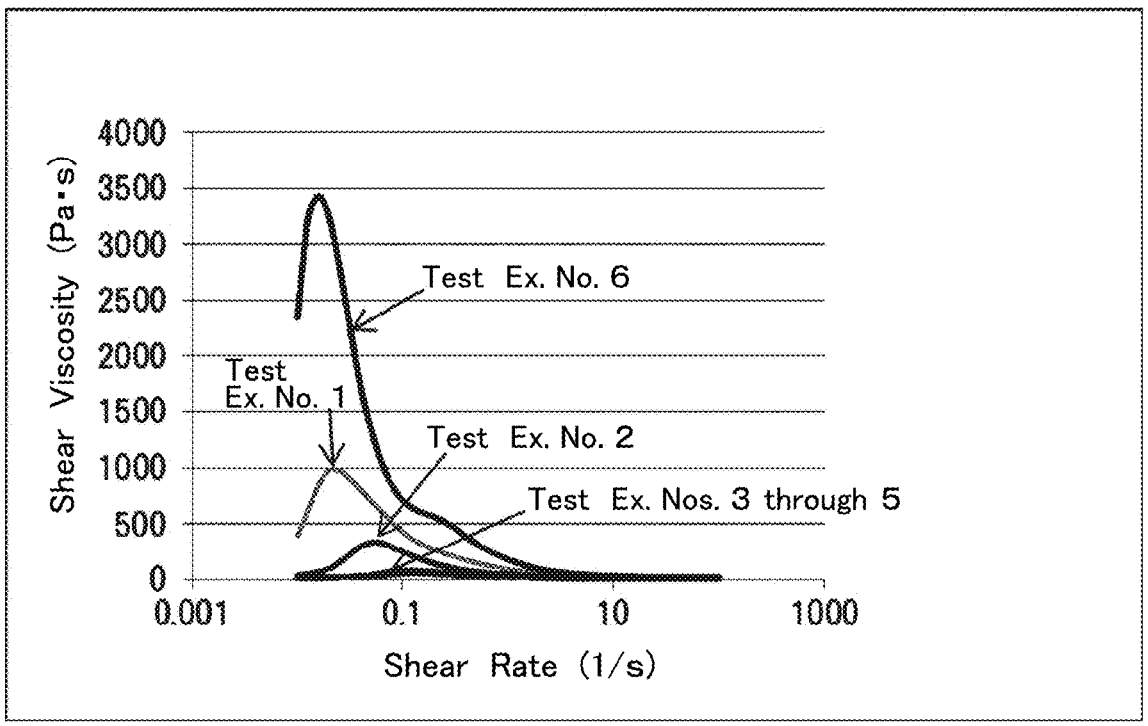
FIG. 1 is a graph showing dependency of the shear viscosity of resinous compositions produced according to examples on the abundance ratio between a first silicone material and a second silicone material.

A silicone-coated filler according to the present invention, and a production process for the same, as well as a resinous composition according to the present invention will be hereinafter described in detail based on an embodiment. A resinous composition according to the present embodiment is usable for radiator members, sealants for semiconductor, materials for electronic substrate, and adhesive agents for electronic component part, adhesive agents connecting electronic part with radiator member.

Silicone-Coated Filler

A silicone-coated filler according to the present embodiment comprises a particulate material, a first silicone structure bonded to the particulate material, and a second silicone bonded to the first silicone structure. In particular, the silicone-coated filler is preferably virtually free from any SiH group in the surface. An IR spectrum enables one to confirm that the silicone-coated filler is virtually free from any SiH group.

A confirmation method by IR spectrum involves the following: an amount of SiH group is sufficiently less so that a sample can be judged to be virtually free from any SiH group when an intensity of a first peak observed at around 2,100 $cm^{-1}$ to 2,200 $cm^{-1}$ is equivalent to another intensity of a second peak observed at around 1,900 $cm^{-1}$ to 2,000 $cm^{-1}$, namely, the former intensity is twice or less approximately as large as the latter intensity by area ratio.

The particulate material is mainly composed of an inorganic oxide formed by oxidizing a predetermined element. An exemplifiable predetermined element involves metallic elements such as Al, Si, Ti, Zr, and Fe. As the predetermined element, the particulate material satisfactorily includes only one of the elements, or adequately includes two or more of the elements. Employing Al as the predetermined element allows the present silicone-coated filler to be good in thermal conductive property.

The particulate material satisfactorily forms a secondary particles in which multiple particles agglomerate. An employable upper limit for a volumetric average particle diameter of the particulate material involves 200 μm, 100

µm, 50 µm, or 10 µm. An employable lower limit for the volumetric average particle diameter involves 0.1 µm, 0.5 µm, 1.0 µm, or 2.0 µm. These upper limit values and lower limit values are combinable arbitrarily. Although the particulate material has any unrestricted configuration, such as exact-spherical shapes or those of pulverized products, it preferably exhibits 0.9 or more, more preferably 0.95 or more, or much more preferably 0.99 or more, in the degree of sphericity.

A combined sum of the first silicone structure and second silicone structure preferably makes such an amount allowing them to coat a surface of the particulate material in one or more layers, or more preferably in two or more layers. The combined sum of the first silicone structure and second silicone structure can be determined based on a superficial area of the particulate material. Specifically, a combined sum of the first silicone structure and second silicone structure required for coating the particulate material in one or more layers can be computed from a superficial area of the particulate material, an area of the first silicone structure and an area of the second silicone structure. Moreover, a preferable range of the combined sum of the first silicone structure and second silicone structure based on a superficial area of the particulate material involves such a lower limit value as 0.00001 g/m$^2$, 0.0001 g/m$^2$ or 0.001 g/m$^2$ approximately; and such an upper limit value as 0.1 g/m$^2$, 0.01 g/m$^2$ or 0.005 g/m$^2$ approximately. These upper limit values and lower limit values are combinable discretionarily.

The first silicone structure bonds to a surface of the particulate material by way of a "'the predetermined element'-OSi—" structure. The first silicone structure has a structure comprising a siloxane structure in which a siloxane bond makes the main chain and whose side chain has an organic group. Of the first silicone structure, a site at which it bonds to a surface of the particulate material is not restricted at all especially. However, the first silicone structure bonds to the surface at a side-chain segment or end segment in the siloxane structure. Although the organic group that the first silicone structure has is not restricted at all especially, an exemplifiable organic group involves alkyl groups (such as a methyl group and ethyl group), phenyl groups, epoxy groups, amino groups, carboxyl groups, aralkyl groups, alkoxy groups, and fluoroalkyl groups; among the options, alkyl groups and phenyl groups are preferable options.

A number of repeating units (Si—O) in the siloxane bond, which the first silicone structure has, is not restricted at all especially. However, an exemplifiable lower limit value for the number involves one, 20, 50, 100, 200, 500, 800, or 1,000. An exemplifiable upper limit value for the number involves 1,000,000, 100,000, 50,000, 20,000, or 10,000. These upper limit values and lower limit values are combinable arbitrarily.

The second silicone structure has a cross-linking structure, and a siloxane structure. Since the siloxane structure of the second silicone structure has the same structure as that of the above-described first silicone structure, selecting constituents from the similar options enables one to determine the siloxane structure, independently of that of the first silicone structure. The cross-linking structure bonds to a silicon atom constituting the first silicone structure at one of the ends of the carbon-carbon bond, and bonds to the second silicone structure at the other one of the ends. As a location at which the cross-linking structure bonds to the first silicone structure, selecting it from the following is possible: an end segment of the first silicone structure; and a midway or intermediate segment in the main chain of the first silicone structure. Moreover, it is possible for the second silicone structure to bond to two or more locations selected from one of the main chains in the first silicone structure. In addition, the cross-linking structure satisfactorily bonds to the second silicone structure directly, or adequately bonds to it by way of a certain spacer disposed between them. A to-be-given spacer involves alkylene groups, and ether bonds.

Production Process for Silicone-Coated Filler

A production process for silicone-coated filler according to the present embodiment comprises a first step, and a second step.

The first step is a step of reacting a first silicone material with a surface of a particulate material. The particulate material is an inorganic oxide formed by oxidizing a predetermined element. A surface of the particulate material has an OH group. The OH group represented by ("the predetermined element")-OH makes an aluminol group when the predetermined element is Al; and makes a silanol group when the predetermined element is Si. Although an amount of the OH group present in a surface of the particulate material is not restricted at all especially, it is set preferably at from one/nm$^2$ to 50/nm$^2$ approximately. Moreover, an exemplifiable lower limit value involves two/nm$^2$, five/nm$^2$, or 10/nm$^2$; and an exemplifiable upper limit value involves 20/nm$^2$, 30/nm$^2$, or 40/nm$^2$.

The first silicone material has multiple SiH groups. Of the multiple SiH groups that the first silicone material has, some of them react with the OH group present in a surface of the particulate material. The remainder of the SiH groups, which the first silicone material has had originally, remains in the first silicone material.

The first silicone material has a structure comprising a siloxane structure in which a siloxane bond makes the main chain and whose side chain has an organic group. Although the organic group is not restricted at all especially, an exemplifiable organic group involves alkyl groups (such as a methyl group and ethyl group), phenyl groups, epoxy groups, amino groups, carboxyl groups, aralkyl groups, alkoxy groups, and fluoroalkyl groups; among the options, alkyl groups and phenyl groups are preferable options. Sites in the first silicone material to which the SiH groups are bonded are not restricted at all especially; however, the SiH groups are bonded to the side chain or ends of the siloxane structure.

A number of repeating units (Si—O) in the siloxane bond, which the first silicone material has, is not restricted at all especially. However, an exemplifiable lower limit value for the number involves one, 20, 50, 100, 200, 500, 800, or 1,000. An exemplifiable upper limit value for the number involves 1,000,000, 100,000, 50,000, 20,000, or 10,000. These upper limit values and lower limit values are combinable discretionarily.

A method of reacting the SiH groups, which the first silicone material has, with the OH groups, which exist in a surface of the particulate material, is not restricted at all especially. For example, dissolving or dispersing the first silicone material in a proper solvent, and then dispersing the particulate material in the solvent make it possible to develop the reaction. A preferable reaction condition involves heating a reaction mixture in a preferred temperature range of from 100° C. to 200° C. In particular, the reaction mixture is more preferably heated at 160° C. approximately. A reaction time is preferably set at from one hour to 24 hours approximately. In particular, the reaction time is more preferably set at 2 hours approximately. As a preferable reaction atmosphere, the reaction is carried out in air. In particular, the reaction is more preferably carried out in explosion-proof equipment.

On this occasion, making the second silicone material coexist with the first silicone material allows carrying out the second step as well. A preferable proper solvent involves solvents being less reactive to SiH group and alkene. Heptane and toluene are exemplifiable options.

The second step is a step of reacting a second silicone material with the SiH groups that remain in the first silicone material bonded to a surface of the particulate material.

The second silicone material has one or two or more alkenyl groups, and bonds to the first silicone material while the alkenyl groups make an addition reaction occur between them and the SiH groups remaining in the first silicone material. An exemplifiable alkenyl group involves vinyl groups. The second silicone material has, in the same manner as the first silicone material, a structure comprising a siloxane structure in which a siloxane bond makes the main chain and whose side chain has an organic group. Although the organic group is not restricted at all especially, an exemplifiable organic group involves alkyl groups (such as a methyl group and ethyl group), phenyl groups, epoxy groups, amino groups, carboxyl groups, aralkyl groups, alkoxy groups, and fluoroalkyl groups; among the options, alkyl groups and phenyl groups are preferable options. Sites in the second silicone material to which the alkenyl groups are bonded are not restricted at all especially; however, the alkenyl groups are preferably bonded to the ends of the siloxane structure.

A number of repeating units (Si—O) in the siloxane bond, which the second silicone material has, is not restricted at all especially. However, an exemplifiable lower limit value for the number involves one, 20, 50, 100, 200, 500, 800, or 1,000. An exemplifiable upper limit value for the number involves 1,000,000, 100,000, 50,000, 20,000, or 10,000. These upper limit values and lower limit values are combinable arbitrarily.

A method of reacting the alkenyl groups, which the second silicone material has, with the SiH groups, which exist in a surface of the particulate material, is not restricted at all especially. However, it is possible to develop the reaction by directly bringing the second silicone material into contact with the particulate material that has been reacted with the first silicone material; or by dispersing the particulate material, which has been reacted with the first silicone material, in a proper solvent and thereafter adding the second silicone material to the dispersion, for instance. A preferable proper solvent involves solvents being less reactive to SiH group and alkene. An exemplifiable solvent involves heptane and toluene. A preferable reaction condition involves heating a reaction mixture in a preferred temperature range of from 100° C. to 200° C. In particular, the reaction mixture is more preferably reacted at 160° C. approximately. A reaction time is preferably set at from one hour to 24 hours approximately. In particular, the reaction time is more preferably set at 2 hours approximately. As a preferable reaction atmosphere, the reaction is carried out in air. In particular, the reaction is more preferably carried out in explosion-proof equipment.

The present production process can further comprise a disappearance step following the second step. The disappearance step is a step of causing the SiH groups, which the first silicone material has, to disappear when the SiH groups remain in the first silicone material. A possible disappearance step involves steps that are set up to bring the resulting present silicone-coated filler into contact with a disappearance agent comprising monoethanolamine and/or diethanolamine. A preferable reaction condition involves reacting the present silicone-coated filler with the disappearance agent in a preferred temperature range of from 5° C. to 40° C. approximately. In particular, the disappearance step is more preferably carried out at ordinary temperature (or room temperature (i.e., 25° C.)) The disappearance step can be operated in air, and is preferably carried out along with such a homogenization operation in which the present silicone-coated filler is mixed and homogenized with a mixer.

A desirable amount of the disappearance agent to be reacted with the present silicone-coated filler involves an amount necessary and sufficient for making the SiH groups disappear. The disappearance step is carried out by bringing the disappearance agent itself into contact with the present silicone-coated filler (i.e., mixing the disappearance agent with the present silicone-coated filler by spraying or stirring); or by bringing the former, which has been turned into a solution using a certain solvent, into contact with the latter. An employable amount of the disappearance agent to be reacted with the present silicone-coated filler involves 0.1%, 0.5%, 0.75%, 1.0%, or 1.5%, based on a mass of the present silicone-coated filler.

Resinous Composition

A resinous composition according to the present embodiment comprises: the above-described silicone-coated filler or a silicone-coated filler produced by the above-described production process; and a silicone resin. A mixing ratio between the silicone-coated filler and the silicone resin is not restricted at all especially; however, the silicone resin is allowed to account for 55% or more based on an entire mass of the resinous composition. Moreover, it is possible to set the amount of the silicone-coated resin at 60% or more, 65% or more, or 70% or more, based on the entire amount. The upper limit is not restricted at all especially, but can be set at 90% or less, 85% or less, 80% or less, 75% or less, or 70% or less, based on the entire mass. A method of dispersing the silicone-coated filler in the silicone resin is not restricted at all especially, but the former can be dispersed in the latter by kneading with a kneader, or the like.

The silicone-coated filler to be added is one that is selected from the group consisting of proper silicone-coated fillers in compliance with applications of the resinous composition. For example, alumina is preferably employed as the inorganic oxide when the resinous composition is used for the application of heat release. Moreover, the silicone-coated film has a form and particle diameter that are selected properly in compliance with applications to which the resinous composition is applied. For example, the silicone-coated filler preferably exhibits a high degree of sphericity when high fluidity is needed. Alternatively, the silicone-coated filler preferably has such a size that allows it to get into certain clearances or interspaces, namely, a size made smaller than sizes of the clearances or interspaces, when being filled and used in the clearances or interspaces.

The silicone resin is not restricted at all especially, but one to be given involves silicone rubbers, silicone gels and silicone oils. Moreover, as the silicone resin, it is possible to employ precursors that react to polymerize.

EXAMPLES

Production of Silicone-Coated Filler and Resinous Composition

Alumina particles serving as a particulate material, and a first silicone material prepared in amounts given in Table 1 were reacted with each other (i.e., a first step). The alumina particles had a volume average particle diameter of 10.0 μm, and exhibited a degree of sphericity of 0.99. The first silicone material was an SiH group-containing silicone, namely, methylhydrogen polysiloxane in which hydrogen substituted for some of the polysiloxane side chains (e.g., "KF9901" produced by SHIN-ETSU KAGAKU KOGYO). After the first step, the alumina particles, which had been reacted with the first silicone material, were treated with a second silicone material prepared in amounts given in Table 1 (i.e., a second step). The second silicone material was a silicone that contained vinyl groups serving as an alkenyl group (e.g., "VF10000" produced by SHIN-ETSU KAGAKU KOGYO). The thus obtained samples were labeled test examples according to Test Example Nos. 1 through 6.

Moreover, alumina particles serving as a particulate material were brought into contact with a silicone resin "A" or a silicone resin "B," both of which had OH groups introduced into the opposite ends and were prepared in amounts given in Table 1. The silicone resin "A" was "X-21-5841" produced by SHIN-ETSU KAGAKU KOGYO, and exhibited a number average molecular weight of 2,000. The silicone resin "B" was "KF9701" produced by SHIN-ETSU KAGAKU KOGYO, and exhibited a number average molecular weight of 2,000. The thus obtained samples were labeled test samples according to Test Example Nos. 7 through 10.

Each of the resultant test samples was dispersed in a silicone resin so as to account for 55% based on an entire volume. The used silicone resin was a straight type silicone (e.g., "KF-96-500cs" produced by SHIN-ETSU KAGAKU KOGYO).

TABLE 1

| | SiH Group-containing Silicone | Vinyl Group-containing Silicone | OH Group-containing Silicone | |
|---|---|---|---|---|
| | | | Silicone "A" | Silicone "B" |
| Test Example No. 1 | 0 | 0 | 0 | 0 |
| Test Example No. 2 | 0 | 0.8 | 0 | 0 |
| Test Example No. 3 | 0.2 | 0.8 | 0 | 0 |
| Test Example No. 4 | 0.4 | 0.8 | 0 | 0 |
| Test Example No. 5 | 0.8 | 0.8 | 0 | 0 |
| Test Example No. 6 | 0.4 | 0 | 0 | 0 |
| Test Example No. 7 | 0 | 0 | 0.8 | 0 |
| Test Example No. 8 | 0 | 0 | 4 | 0 |
| Test Example No. 9 | 0 | 0 | 0 | 0.8 |
| Test Example No. 10 | 0 | 0 | 0 | 4 |

Measurement of Viscous Characteristic

The respective test samples were measured for the shear viscosity. The shear viscosity was measured using "ARES G2" produced by TA INSTRUMENT in a range of shear rate from 0.001 (1/s) to 1,000 (1/s). FIG. 1 shows the measurement results for Test Example Nos. 1 through 6, and FIG. 2 shows the measurement results for Test Example Nos. 7 through 10.

FIG. 1 clearly shows that resinous compositions (hereinafter referred to as "Resinous Composition Nos. 3 through 5), which were prepared using Test Example Nos. 3 through 5 that were treated with both of the SiH containing-silicone and vinyl group-containing silicone, apparently produced a greater viscosity-lowering effect than that of Resinous Composition No. 1 in which the untreated alumina particles themselves were dispersed, because Resinous Composition Nos. 3 through 5 exhibited a considerably lower viscosity than that of Resinous Composition No. 1. Note that, in FIG. 1, all of Resinous Composition Nos. 3 through 5 exhibited a very low viscosity so that they are held downward (i.e., in a shear-viscosity range of 100 Pa/s or less) in the graph. In contrast thereto, Resinous Composition No. 2 treated with the vinyl group-containing silicone alone was found to be unable to demonstrate a sufficient viscosity-lowering effect, because Resinous Composition No. 2 exhibited a higher viscosity than that of Resinous Composition Nos. 3 through 5 treated with both of the SiH group-containing silicone and vinyl group-containing silicone, although Resinous Composition No. 2 exhibited a lower viscosity than that of Resinous Composition No. 1. This seems that the treatment of the particulate material with the SiH group-containing silicone allows achieving a sufficient bonding of the second silicone material to the particulate material on the surface, thereby permitting a viscosity-lowering operation to demonstrate sufficiently.

Figure 2:
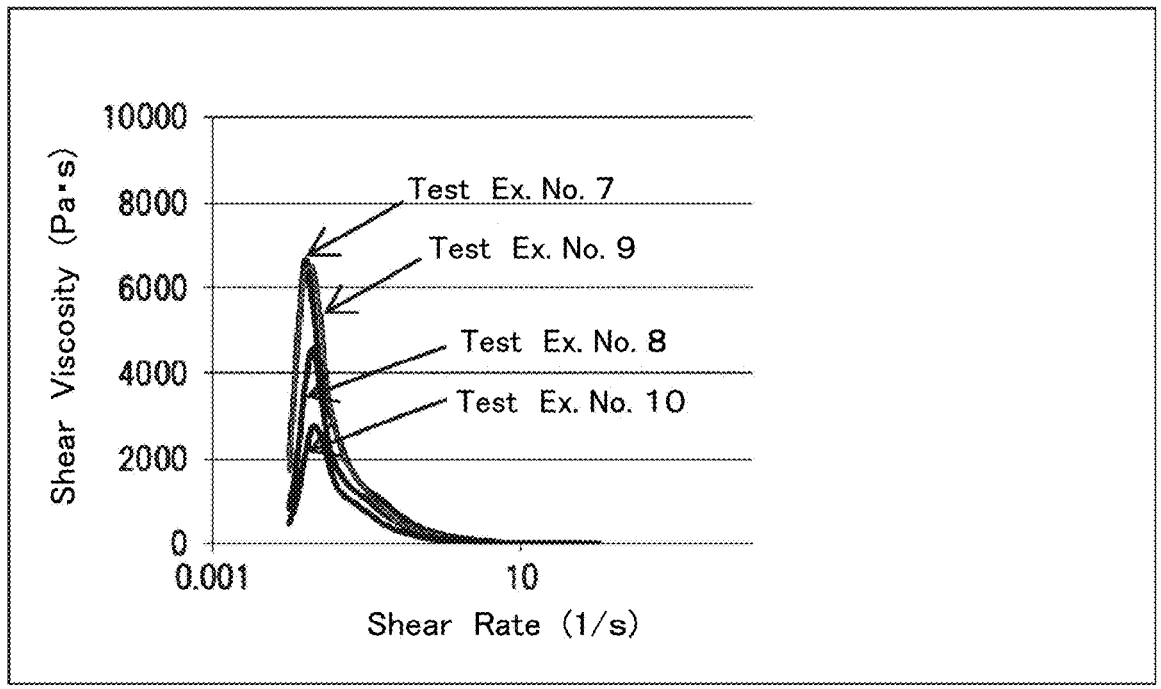
FIG. 2 is a graph showing the shear viscosity of resinous compositions produced according to examples using silicone-coated fillers that were treated with OH group-containing silicones.

The fact can also be speculated by the high viscosities shown in FIG. 2. The OH group-containing silicones, which simply adsorb physically onto a surface of the particulate material, do not seem to be able to demonstrate any viscos-lowering effect sufficiently as shown in FIG. 2 that gives the results demonstrated by Resinous Composition Nos. 7 through 10.

Moreover, it was revealed that a great viscosity-lowering effect is demonstrated by not only reacting the first silicone material with a surface of the particulate material but also additionally reacting the second silicone material with the surface, because Resinous Composition No. 6 comprising the particulate material reacted with the first silicone material (i.e., the SiH group-containing silicone) alone exhibited higher viscosities than did Resinous Composition No. 1, and because Resinous Composition No. 2 comprising the particulate material reacted with the second silicone material (i.e., the vinyl group-containing silicone) alone exhibited lower viscosities than did Resinous Composition No. 1. Thus, it becomes possible to remarkably upgrade a filling amount of alumina, a filler for moisture-curing silicone and peroxide-curing silicone. However, in the case of filling Test Sample No. 4 in an addition-curing silicone, the addition-curing silicone, and remaining active functional groups (i.e., SiH groups) resulting from one of the surface treatment agents (i.e., the SiH group-containing silicone), cause a polymerization reaction so that the addition-curing silicone and Test Sample No. 4 has turned into a cured substance when they are kneaded. The details will be disclosed in a later-described section titled (Investigation into Reaction Characteristic to Precursor of Silicone Resin).

Investigation into Step of Making SiH Group Disappear

Investigations were performed on whether or not superficial SiH groups were present when various compounds were reacted with Test Sample No. 4, and on how they affected precursors of the silicone resins. The reactions were carried out by directly bringing the compounds into contact with Test Sample No. 4.

Figure 3:
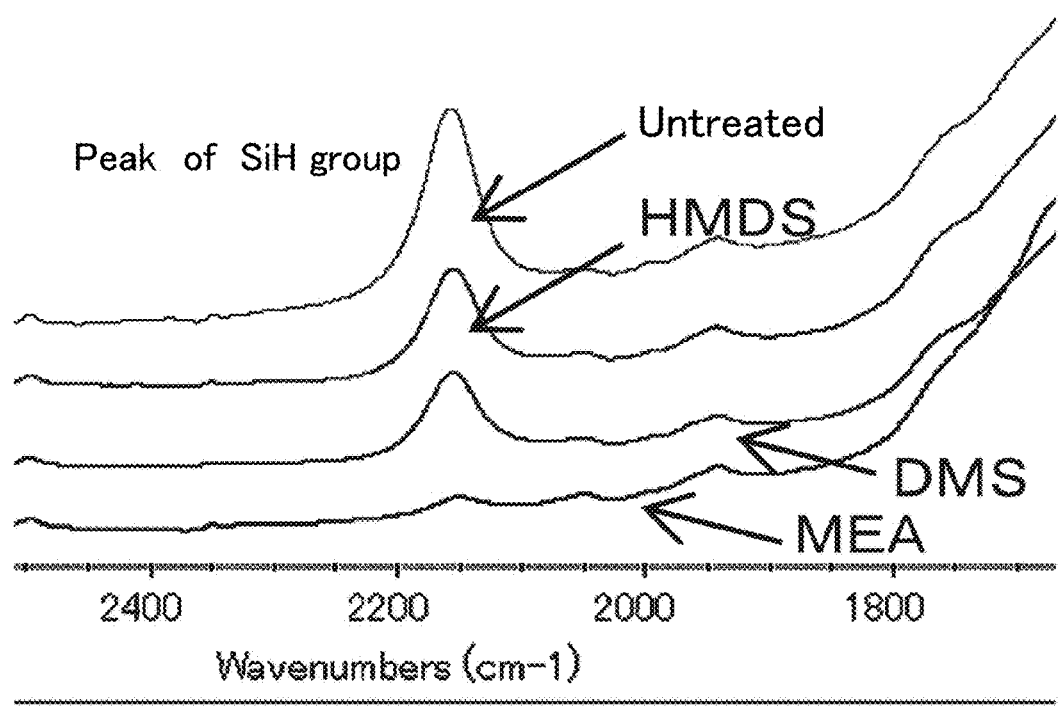
FIG. 3 is an IR spectrum measured for the purpose of evaluating SiH groups remaining in the surface of silicone-coated fillers according to examples.
Figure 4:
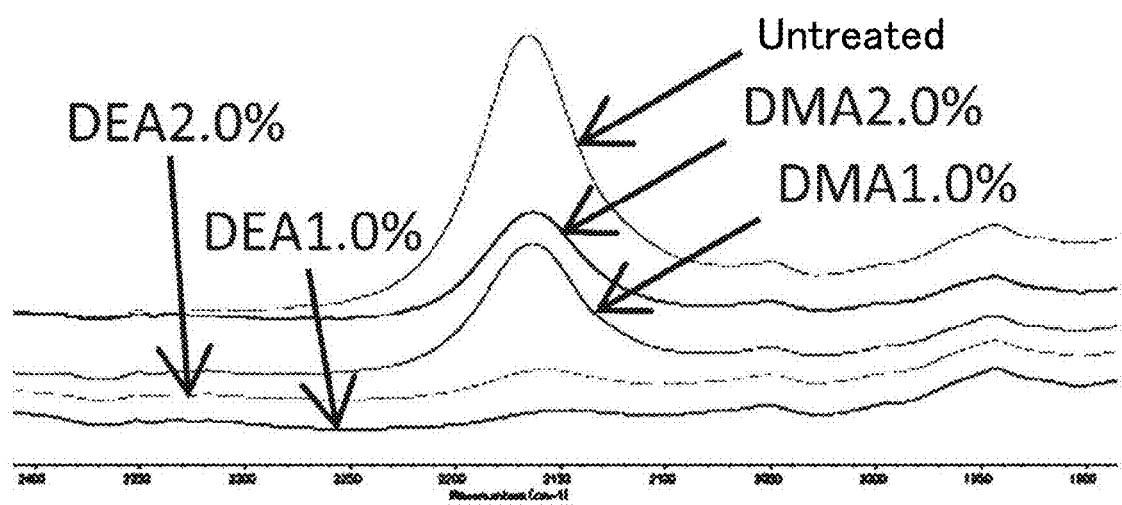
FIG. 4 is another IR spectrum measured for the purpose of evaluating SiH groups remaining in the surface of silicone-coated fillers according to other examples.

The following were investigated respectively for types and addition amounts of the various compounds: 3.64%-by-mass dimethyldimethoxysilane (or DMS); 3.64%-by-mass hexamethyldisilazane (or HMDS); 2.0%-by-mass and 1.0%-by-mass dimethylamine (or DMA); 2.0%-by-mass and 1.0%-by-mass diethanolamine (or DEA); and 3.64%-by-mass monoethanolamine (or MEA). Test Sample No. 4 was left at 80° C. for 240 minutes to complete reactions after having been brought into contact with each of the compounds. The thus obtained reaction products were observed for the infrared (IR) spectrum. FIGS. 3 and 4 show the results.

FIG. 3 revealed that Test Sample No. 4 treated with MEA could reduce the amount of SiH groups more than did the untreated test sample and the other test samples treated with HMDS or DMS. Moreover, FIG. 4 clarified that Test Sample No. 4 treated with DEA could reduce the amount of SiH groups more than did the test sample treated with DMA. Thus, both of MEA and DEA were found to be able to reduce the amount of SiH groups sufficiently.

Figure 5:
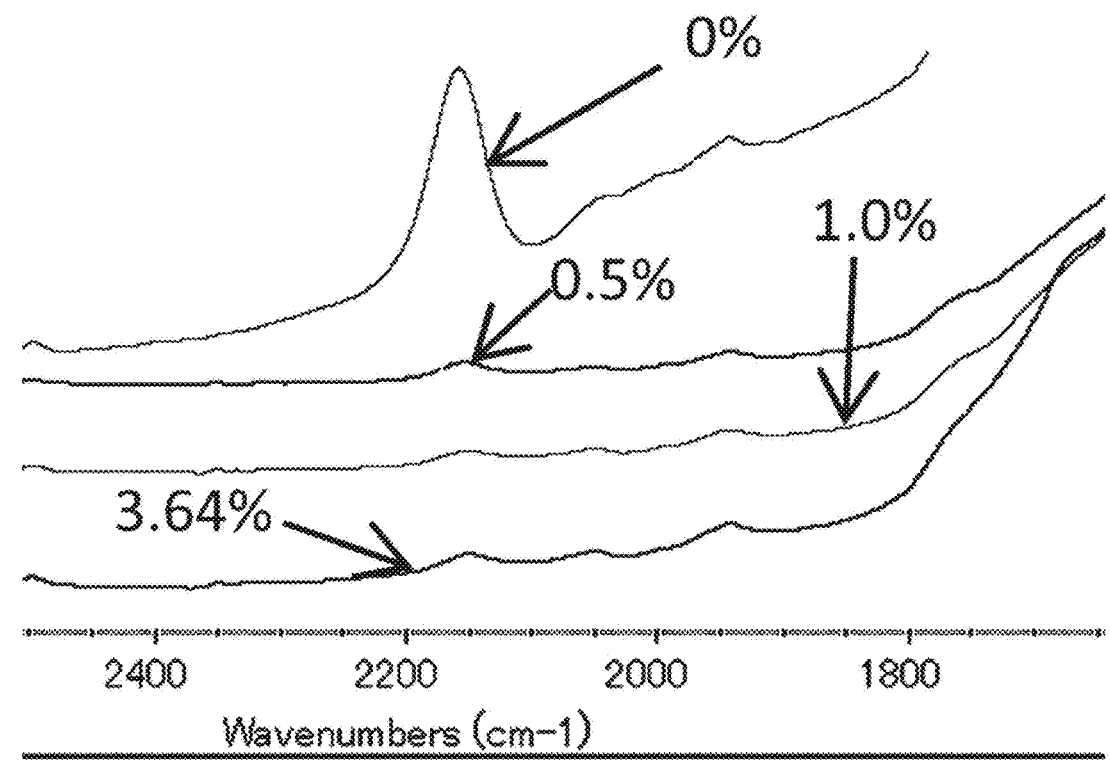
FIG. 5 is still another IR spectrum measured for the purpose of evaluating SiH groups remaining in the surface of silicone-coated fillers according to still other examples.

In order to investigate how MEA reduced the amount of SiH groups when the addition amount was changed, Test Sample No. 4 was observed for the infrared (IR) spectrum to examine the amount of SiH groups existing in the surface after MEA had been reacted with Test Sample No. 4 in a proportion of 0.5%, 1.0% and 3.64% based on a mass relative to that of Test Sample No. 4. FIG. 5 shows the results. As can be seen from the drawing, MEA was found to be able of reducing the amount of SiH groups sufficiently even when the addition amount was 0.5%.

Investigation into Reaction Characteristic to Precursor of Silicone Resin

Figure 6:
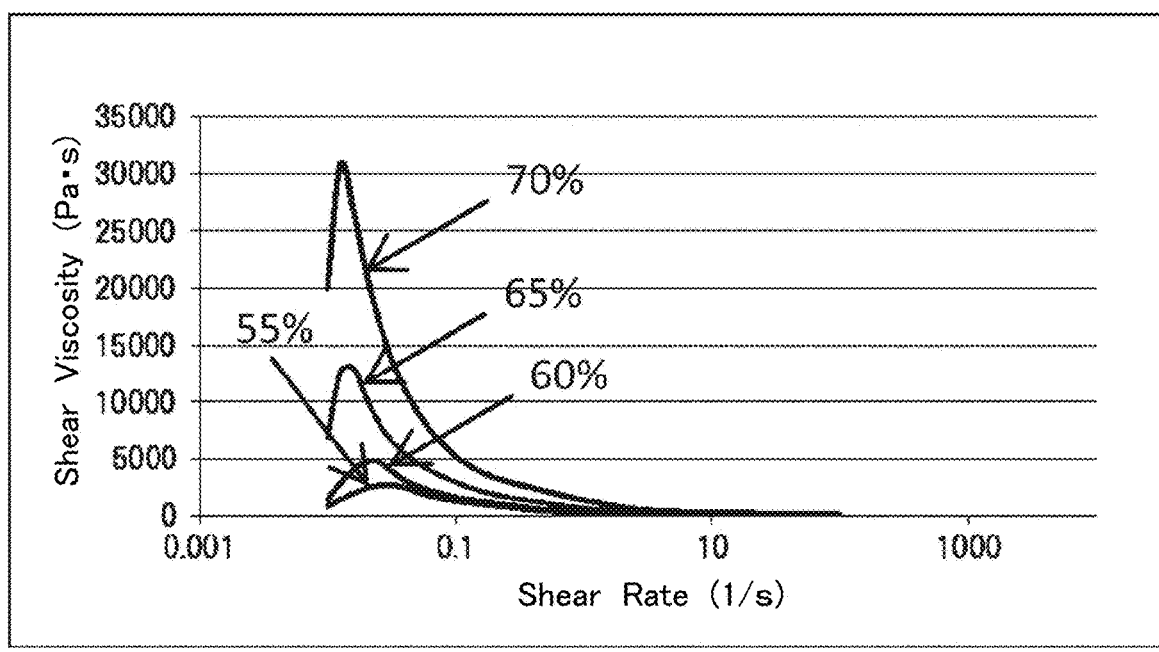
FIG. 6 is a graph showing shear viscosities measured for the purpose of evaluating relationships between the amount of SiH groups remaining in the surface of silicone-coated fillers according to examples and the shear viscosity of produced resinous compositions.
Figure 7:
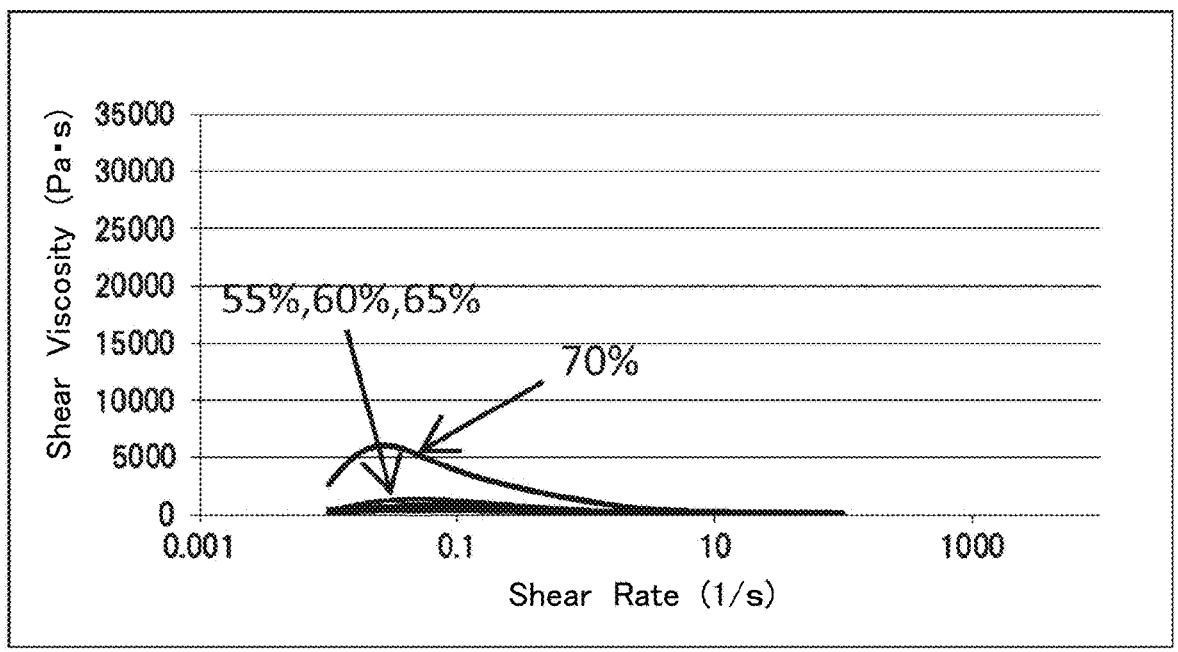
FIG. 7 is another graph showing shear viscosities measured for the purpose of evaluating relationships between the amount of SiH groups remaining in the surface of silicone-coated fillers according to other examples and the shear viscosity of other produced resinous compositions.

The following three test samples were prepared: Test Sample No. 11 without any surface treatment, namely, true-sphere-shaped alumina produced by ADMATECHS Co., Ltd. and having a particle diameter of 10 μm; Test Sample No. 12 in which SiH groups remained in the surface, namely, Test Sample No. 4 itself; and Test Sample No. 13 in which SiH groups disappeared largely in the surface, namely, Test Sample No. 4 treated with 0.5%-by-mass MEA. The three test samples were mixed in a silicone precursor (e.g., "KE1031-AB," a two-component RTV rubber, produced by SHIN-ETSU KAGAKU KOGYO) so as to account for 55%, 60%, 65% and 70% based on an entire mass of the mixture. The resultant resinous compositions were measured for the shear viscosity. FIG. 6 shows the results that Test Sample No. 11 produced, and FIG. 7 shows the results that Test Sample No. 13 produced.

Figure 8:
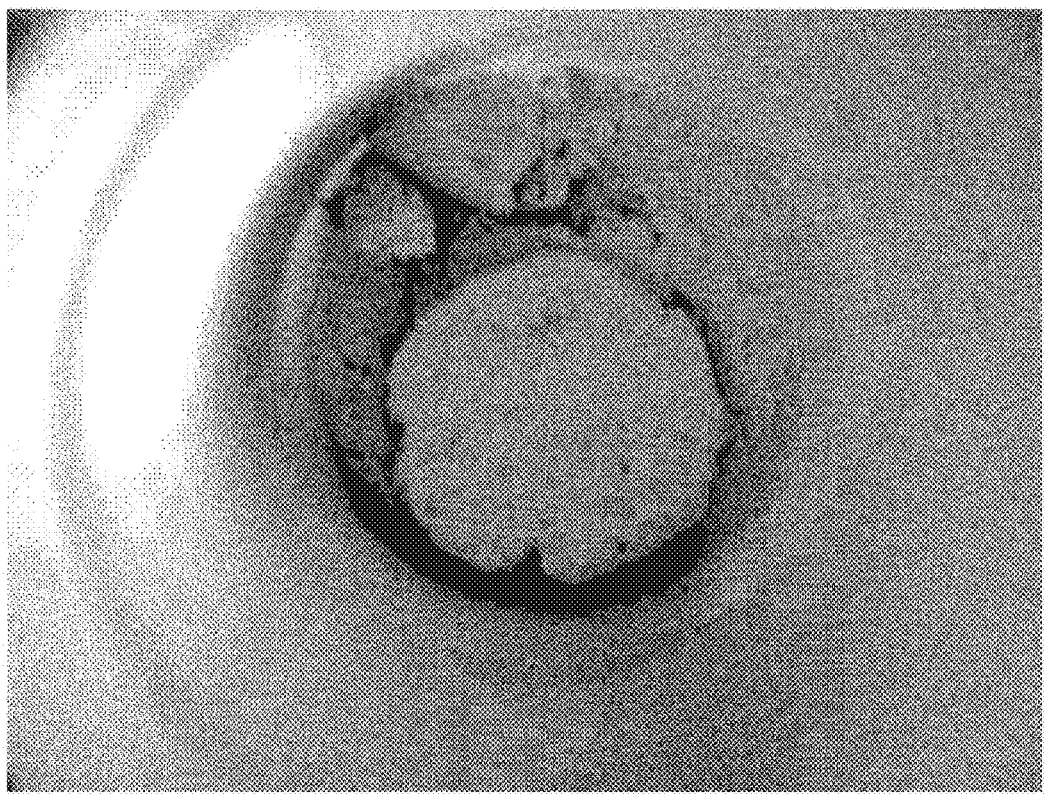
FIG. 8 is a diagram showing an experimental example that exemplified curing of a resinous composition according to an example in which likely-to-remain active functional groups resulting from a surface treatment agent remained.

FIG. 6 revealed that, in Test Sample No. 11 without any surface treatment, the viscosity was found to rise remarkably at any of the addition amounts. In Test Sample No. 12, which had undergone the two-staged silicone surface treatment but still had SiH groups remaining in the surface, remaining active functional groups (i.e., SiH groups) resulting from one of the surface treatment agents (i.e., the SiH group-containing silicone), and an addition-curing silicone resulting from the silicone precursor caused a polymerization reaction so that the addition-curing silicone and Test Sample No. 4 had turned into a cured substance when they were kneaded. FIG. 8 shows how the cured addition-curing silicone and Test Sample No. 4 appeared. FIG. 7 shows that Test Sample No. 13 in which no SiH groups remained was found to inhibit the viscosity from rising more effectively at any of the addition amounts than did Test Sample No. 11 undergone no surface treatment.

Note that the following are not detailed; however, the present inventors confirmed that, in addition to alumina, silica, zirconia, titania and iron oxide allow the first silicone material to react with OH groups existing in a surface of the particulate material, and further permit the second silicone material to react with the OH groups.

What is claimed is:
1. A silicone-coated filler comprising:
   a particulate alumina;
   a first silicone structure bonded to a surface of the particulate alumina via OSi bonds and
   a second silicone structure comprising a cross-linking structure with a carbon-carbon structure directly bonded to a silicon atom of the first silicone structure, and a polysiloxane structure bonded to the cross-linking structure;
   wherein the silicone-coated filler is contacted with monoethanolamine, diethanolamine, or both, in an amount of 0.1-1.5% by mass so that the surface of the silicone-coated filler is free from any SiH group.
2. A composition comprising:
   the silicone-coated filler according to claim 1 dispersed in a silicone-resin precursor containing an addition-curing silicone.
3. A cured composition comprising the composition according to claim 2 that is cured.
4. The silicone-coated filler according to claim 1, wherein the particulate alumina has a volume average particle size of 2 μm to 50 μm.

* * * * *